US010148759B2

(12) United States Patent
Lauer

(10) Patent No.: US 10,148,759 B2
(45) Date of Patent: Dec. 4, 2018

(54) PRESENCE-BASED NETWORK AUTHENTICATION

(71) Applicant: GOGO LLC, Chicago, IL (US)

(72) Inventor: Bryan Adrian Lauer, Hinckley, IL (US)

(73) Assignee: GOGO LLC, Chicago, IL (US)

( * ) Notice: Subject to any disclaimer, the term of this patent is extended or adjusted under 35 U.S.C. 154(b) by 262 days.

(21) Appl. No.: 15/090,026

(22) Filed: Apr. 4, 2016

(65) Prior Publication Data

US 2017/0289119 A1 Oct. 5, 2017

(51) Int. Cl.
*G06F 21/00* (2013.01)
*H04L 29/08* (2006.01)
*H04W 12/06* (2009.01)
*G06F 21/31* (2013.01)
*H04W 4/12* (2009.01)

(52) U.S. Cl.
CPC .............. *H04L 67/12* (2013.01); *G06F 21/31* (2013.01); *H04W 4/12* (2013.01); *H04W 12/06* (2013.01); *G06F 2221/2133* (2013.01); *H04L 2209/84* (2013.01)

(58) Field of Classification Search
CPC ....... H04L 63/08; H04L 67/12; H04L 63/102; H04L 2209/84; H04W 12/06; H04W 4/12; G06F 21/31; G06F 2221/2133
See application file for complete search history.

(56) References Cited

U.S. PATENT DOCUMENTS

| | | | |
|---|---|---|---|
| 7,308,261 | B2 | 12/2007 | Henderson et al. |
| 8,386,773 | B2 | 2/2013 | Sherkin et al. |
| 8,620,315 | B1 | 12/2013 | Merritt et al. |
| 2006/0199598 | A1 | 9/2006 | Lee et al. |
| 2007/0213039 | A1 | 9/2007 | Skog |
| 2008/0188250 | A1 | 8/2008 | Agarwal et al. |
| 2010/0287606 | A1 | 11/2010 | Machani |
| 2011/0225629 | A1* | 9/2011 | Pai ........................ G06F 21/36 726/3 |

(Continued)

FOREIGN PATENT DOCUMENTS

| | | |
|---|---|---|
| CN | 102215179 A | 10/2011 |
| EP | 1763262 A1 | 3/2007 |
| WO | WO-01098956 A1 | 12/2001 |

OTHER PUBLICATIONS

M. Hassan Shirali-Shahreza, "An Anti-SMS-Spam Using CAPTCHA," *ISECS International Colloquium on Computing, Communication, Control, and Management*, 2008, pp. 318-321.

*Primary Examiner* — Kendall Dolly
(74) *Attorney, Agent, or Firm* — Marshall, Gerstein & Borun LLP; Randall G. Rueth

(57) ABSTRACT

Systems and methods are provided to authenticating an electronic device with a wireless network using a presence-based authentication process. As part of the presence-based authentication process, an authentication entity may receive a registration message from an electronic device. The authentication entity may respond to the registration message by transmitting an authentication challenge associated with providing access to the wireless network and/or network feature thereof. If the electronic device provides a successful response to the authentication challenge, then the authentication entity may authenticate the electronic device to utilize the wireless network and/or network feature thereof.

16 Claims, 8 Drawing Sheets

(56) References Cited

U.S. PATENT DOCUMENTS

| | | |
|---|---|---|
| 2011/0250909 A1 | 10/2011 | Mathias et al. |
| 2012/0148043 A1* | 6/2012 | Tofighbakhsh ....... H04L 63/101 380/247 |
| 2012/0264427 A1 | 10/2012 | Adatia et al. |
| 2013/0205386 A1 | 8/2013 | Thompson |
| 2013/0324170 A1 | 12/2013 | Watfa |
| 2014/0115676 A1 | 4/2014 | Coghlan et al. |
| 2014/0243987 A1 | 8/2014 | Wagner et al. |
| 2015/0143486 A1* | 5/2015 | Hartmann ............. H04W 12/06 726/6 |

* cited by examiner

PRESENCE-BASED NETWORK AUTHENTICATION

CROSS-REFERENCE TO RELATED APPLICATIONS

This application is related to U.S. application Ser. No. 13/781,841 (now U.S. Pat. No. 9,147,065) filed Mar. 1, 2013 and entitled "DETERMINING HUMAN STIMULI AT COMPUTING DEVICES," the entire disclosure of which is incorporated herein by reference.

TECHNICAL FIELD

The following disclosure relates to systems and methods for authenticating electronic devices with a network based on presence, and more particularly, for initiating the authentication process without interaction between electronic devices and users thereof.

BACKGROUND

Generally, electronic devices (e.g., mobile phones, tablets, laptops, smart watches, and/or the like) are capable of automatically or manually connecting to a plurality of different wireless networks. Access to these wireless networks is typically regulated by an authentication server, such as an authentication, authorization, and accounting server (a AAA). These AAAs may ensure that only authenticated electronic devices are allowed to access the wireless network. For example, many electronic devices rely on SIM cards to configure the phone to communicate over a particular wireless network. If the electronic device contains a SIM card not associated with a service plan on the particular wireless network (i.e., the owner purchased the SIM card without a service plan), the AAA may prevent the electronic device from utilizing the wireless network.

Individuals may carry electronic devices to locations in which the only wireless network is one offered by an operator or service provider other than the one with which an individual has a preexisting relationship. For example, the operator of wireless networks on-board many types of vehicles are not provided by nationwide, terrestrial network operators. In these scenarios, individuals may need access to the on-board wireless networks for limited period of time (e.g., the duration of a trip). Thus, authentication for these on-board wireless networks may be negotiated when the individual is located in a vehicle equipped with such an on-board wireless network.

Traditionally, the individual is required to actively attempt to utilize the on-board wireless network to begin authentication process. However, in situations where the individual is unaware that the vehicle is equipped with an on-board wireless network, the individual may never attempt to utilize the network. Moreover, many on-board wireless networks may provide a plurality of different communication services (e.g., voice, SMS, SMS over Wi-Fi, VOIP, VPN, IM, etc.). Accordingly, even if an individual is aware of the on-board wireless network, the individual may be unaware of the extent that their electronic devices are capable of utilizing the on-board wireless network. Accordingly, there is a need to initiate the authentication process without waiting for the individual to first attempt to utilize the on-board wireless network.

SUMMARY OF THE DISCLOSURE

In one embodiment, a method of authenticating an electronic device with a wireless network associated with a vehicle is provided. The method may include (1) detecting, by an authentication server, a registration request, the registration request being automatically transmitted by the electronic device in response to the electronic device detecting the presence of the wireless network; (2) in response to detecting the registration request, transmitting, via the wireless network, a challenge, the challenge including (i) an indication of an expected sequence of symbols and (ii) an indication of a first feature of the wireless network; (3) detecting, at the authentication server, a response to the challenge, the response including an indication of user input received by the electronic device; (4) determining, by the authentication server, that the user input matches the expected sequence of symbols; and (5) causing, by the authentication server, the electronic device to be authorized to utilize a first feature of the wireless network.

In another embodiment, a system for authenticating an electronic device with a wireless network associated with a vehicle is provided. The system may include (i) one or more processors; and (ii) one or more non-transitory, computer-readable storage media storing computer-executable instructions. The instructions, when executed by the one or more processors, cause the system to (1) detect a registration attempt by the electronic device, the registration attempt initiated in response to the electronic device detecting the presence of the wireless network; (2) in response to detecting the registration attempt, transmit, via the wireless network, a challenge, the challenge including an indication of an access code associated with a first feature of the wireless network; (3) detect a response to the challenge, the response including an indication of user input received by the electronic device; (4) determine that the user input matches the access code; and (5) update a profile associated with the electronic device to authorize the electronic device to utilize the first feature of the wireless network.

In yet another embodiment, a non-transitory computer-readable storage medium storing processor-executable instructions, that when executed cause one or more processors to (1) detect a registration request automatically transmitted by an electronic device in response to the electronic device detecting the presence of a wireless network associated with a vehicle; (2) in response to detecting the registration request, transmit, via the wireless network, a challenge, the challenge including an indication of an expected sequence of symbols; (3) detect a response to the challenge, the response including an indication of user input received by the electronic device; (4) determining that the user input matches the expected sequence of symbols; and (5) cause the electronic device to be authorized to utilize a first feature of the wireless network.

DETAILED DESCRIPTION

Figure 1:
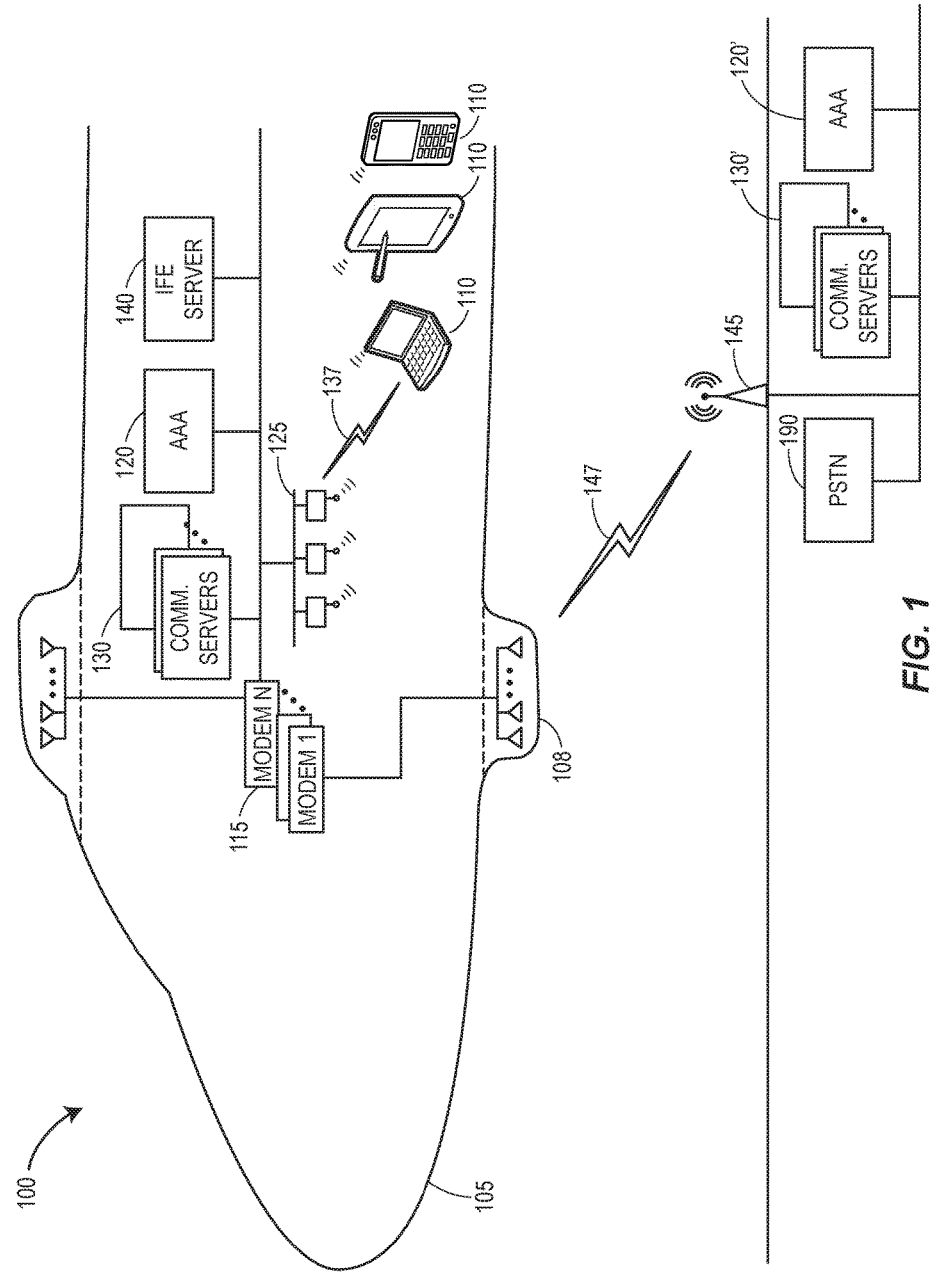
FIG. 1 depicts an embodiment of an exemplary communication system capable of performing one or more of the presence-based network authentication capabilities disclosed herein.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Traditionally, when an electronic device attempts to register with any wireless network, the electronic device transmits a registration message. For example, a mobile phone may automatically attempt to register with a Wi-Fi network with which the mobile phone has previously registered. The registration message may identify the electronic device and/or provide a passkey or other authentication credential required to access the wireless network. In response, an authentication, authorization, and accounting server (a "AAA") or other authentication entity may compare the identity and authentication credential to a database to determine whether the electronic device should be granted access to the wireless network. If the electronic device is authorized, the electronic device is assigned an address at which it is reachable over the wireless network, thus providing access to the wireless network.

Upon the AAA authenticating the electronic device to utilize the wireless network, the electronic device and the AAA may negotiate a feature set associated with the network access. As part of this negotiating process, both the electronic device and the wireless network may each be associated a set of supported features. For any overlapping features between the two sets of supported features, the AAA may attempt to register the electronic device to utilize each overlapping feature. For certain features, this may involve the AAA forwarding information contained within the original registration message to a server associated with the specific feature to determine whether to grant access to the specific feature. In one embodiment, these servers corresponding to network features may maintain a registry of all devices authorized to utilize the corresponding features, as well as any configuration parameters associated therewith.

As an example, a typical short message service (SMS) over Wi-Fi implementation utilizes an additional server to convert the message between traditional SMS formats and the packet format required to transmit data over Wi-Fi. For some wireless networks, the SMS over Wi-Fi feature may be sold as an optional network feature. In these wireless networks, not every device authenticated to access the wireless network is authorized to utilize the SMS over Wi-Fi feature. In one embodiment, when an electronic device that supports SMS over Wi-Fi is authenticated to access the wireless network, the AAA may interact with the server associated with SMS over Wi-Fi to determine whether to authorize the electronic device for usage of the SMS over Wi-Fi feature. In some scenarios, this may involve the AAA and the electronic device exchanging further authentication credentials specific to the SMS over Wi-Fi feature. If the AAA determines that the electronic device provided the correct credentials, the AAA may authorize the electronic device to access the SMS over Wi-Fi feature of the wireless network.

However, these traditional approaches may not be optimal for wireless networks that are typically used for fixed intervals and/or on a one-off basis, such as a wireless network associated with a vehicle (an "on-board wireless network"). To this end, access to on-board wireless networks and/or features thereon may preferably be negotiated at the time of use rather than in advance as determined by a pre-purchased service plan. Exacerbating this problem, many electronic devices are configured to automatically attempt to connect to compatible wireless networks. Because on-board wireless networks typically utilize communication protocols and/or frequency ranges comparable to those utilized by nationwide, terrestrial wireless networks (e.g., Wi-Fi, LTE, WiMax, EVDO, etc.), electronic devices disposed in a vehicle equipped with an on-board wireless network may automatically attempt to connect to the on-board wireless network. However, because many of these electronic devices are not associated with a service plan for the on-board wireless network, the AAA may prevent these electronic devices from accessing the on-board wireless network and/or any network features associated therewith.

Conventionally, access to on-board wireless networks is instead granted through interactions with a captive portal (i.e. a landing, re-direct, or capture webpage for negotiating network access). In the conventional scenario, when an electronic device automatically attempts to register with a wireless network, a corresponding AAA assigns the electronic device a default profile restricting external communications. When a user of an electronic device actively attempts to access the on-board wireless network, the AAA (or other network entity) causes the captive portal to be displayed on the electronic device. The captive portal may enable the individual to purchase network (and/or feature) access and/or agree to terms of use. Upon completing the required interactions with the captive portal, the AAA may grant the electronic device access to the on-board wireless network and any purchased features thereof by changing the profile associated with the electronic device accordingly.

However, many individuals are deterred by the captive portal solution, finding it to be too cumbersome to complete. Thus, not only does the operator of the on-board wireless network lose revenue from potential customers, but, due to many electronic devices being configured to reattempt network registration in the presence of a compatible wireless network, these electronic devices may continuously and unsuccessfully attempt to reconnect to the on-board wireless network. Because these on-board wireless networks may have limited available bandwidth, these unsuccessful reconnection attempts may negatively impact the network performance for electronic devices authenticated onto the on-board wireless network.

Instead, the present embodiments may streamline the authentication and authorization processes to reduce the amount of network resources dedicated to unauthenticated electronic devices through the use of the presence-based network authentication techniques discussed herein. Generally, the presence-based network authentication solution entails a AAA transmitting an authentication challenge to an electronic device in response to receiving a registration attempt from the electronic device. By actively transmitting an authentication challenge, the user of the electronic device may be presented a means to negotiate authentication to the on-board wireless network without first attempting to actively utilize the on-board wireless network. In effect, the transmission of presence-based network authentication enables an electronic device to be authenticated to access the on-board wireless network without ever being re-directed to a captive portal. To this end, due to the authentication process being triggered in response to an electronic device's automatic attempt to register with a wireless network upon detecting the network's presence, the network authentication may be considered "presence-based." It should be appreciated that this use of "presence" is not intended to refer to the technical presence service as defined within some communication protocols (e.g., LTE).

As it is used generally herein, an "authentication challenge" refers to a request that the user of an electronic device proves that the user is, in fact, a human. One common type of authentication challenge is Completely Automated Public Turing test to tell Computers and Humans Apart (CAPTCHA) challenge. Generally, a CAPTCHA challenge may involve the reception of user input based upon an image presented to a user of the electronic device. For example, the CAPTCHA challenge may require that the user responds with a word depicted in the presented image. An "authentication challenge" may additionally or alternatively include any known variation on the general CAPTCHA techniques, such as, for example, requesting that a user provides an answer to a simple and/or common sense question, including simple math problems, identifying visually depicted objects or events, and/or requiring the user reply with an indication specific to a vehicle context. Accordingly, the expected sequence of symbols required to successfully pass an authentication challenge may be a number, a word, a series of ASCII characters, or a series of symbols automatically generated upon a particular interaction with the electronic device. One such vehicle context variation is described in related U.S. application Ser. No. 13/781,841, which is included by reference in its entirety. It should be appreciated the term "authentication challenge" excludes the provision of static network passwords (e.g., a WEP/WPA password that commonly secure Wi-Fi networks) as these may be readily hard-programmed into automatic systems, thus providing no insight as to whether the user of the electronic device is, in fact, human.

As part of the registration attempt, the electronic device may transmit a registration message. In response, the AAA may associate the electronic device with a basic access profile. The basic profile may authorize the electronic device to utilize communication services to the extent required to negotiate authentication, while restricting communications to external entities not associated with the provider and/or operator of the on-board wireless network. Said another way, in some embodiments, the basic profile authenticates the electronic device with the on-board wireless network, but does not authorize the electronic device to utilize any network features and/or services. As it is generally used elsewhere herein, the term "authorize" (or other similar reference to enabling an electronic device to utilize a network feature and/or communication service) refers to the ability to utilize the network feature and/or communication service to establish a bi-directional communication link with the aforementioned external entities. In some embodiments, other electronic devices disposed within the same vehicle equipped with the on-board wireless network may be considered "external" to the on-board wireless network.

After associating the electronic device with the basic profile, the AAA may begin the feature negotiation stage of the registration process. As part of the feature negotiation stage, the electronic device may transmit a list of network features supported by the electronic device. This feature list may transmitted as part of the registration message and/or a subsequent communication with the AAA. After receiving the feature list from the electronic device, the AAA may identify a list of network features supported by both the electronic device and the on-board wireless network. The AAA may then determine whether any of the common supported network features are communication services, such as SMS, multimedia messaging service (MMS), a messaging service associated with the particular vehicle, voice over internet protocol (VOIP), and/or other similar types of services utilize to transmit textual, visual and/or audio data. If the supported network features include a communication service, the AAA may transmit the authentication challenge in a format adapted to that communication service. For example, if the communication service is a SMS service, the AAA may transmit the authentication challenge via a SMS message from a short message service center (SMSC). Similarly, if the communication service is a VOIP service, the AAA may transmit the authentication challenge via a VOIP robo-call from an interactive voice response (IVR) server. It should be appreciated that in several scenarios, the electronic device may indicate that it supports multiple communication services. Thus, the AAA may be associated with a prioritized list of communication services to use for determining which of the multiple supported communication services to utilize for the authentication challenge. For example, the on-board wireless network may be configured to utilize the SMS service over a VOIP service if both communication services are supported.

It should be further understood that the above examples are not intended to be limiting. To this end, any communication service may be utilized to transmit the authentication challenge. In addition to the SMS, MMS, and VOIP communication services, the electronic device may have a communication client installed to facilitate communications in a particular format. For example, the electronic device may have any one of an internet messaging application (such as Facebook Messenger, AOL Instant Messenger, Yahoo Messenger, Google Hangouts, Skype, Microsoft Lync, and so on), an email application (such as a native email client, Microsoft Outlook, Gmail, and so on), or any other application configured to receive communications from a server. These additional communication services may be more commonly used when the electronic device only supports Wi-Fi communications; however, the authentication challenge may be transmitted using any supported communication service for any type of electronic device.

As a result, when the user of the electronic device carries the electronic device onto a vehicle equipped with an on-board wireless network capable of performing the presence-based network authentication, the electronic device may automatically receive a message encouraging the user to utilize the on-board wireless network and/or a network feature associated therewith. As described above, the message may include an authentication challenge designed to ensure that a human is operating the electronic device. In response, the user may indicate an intention to utilize the on-board wireless network by replying with the correct response to the authentication challenge. Assuming the user provided the correct response to the challenge, the AAA may authenticate the electronic device to utilize the on-board wireless network.

In some embodiments, the authentication challenge may be associated with a particular feature of the on-board wireless network as opposed to general access to the on-board wireless network. For example, the operator of the on-board wireless network may configure the AAA to grant all devices access to Wi-Fi; however, access to a VOIP services may require special access. Accordingly, in these embodiments, in response to receiving a registration message from an electronic device, the AAA may authorize the electronic device to utilize Wi-Fi (i.e., Wi-Fi access is included in the basic profile), while still transmitting an authentication challenge to the electronic device to control access to the VOIP service.

According to certain aspects, access to the on-board wireless network and/or network features associated therewith may be associated with a fee. Conventionally, a user may pay this fee by entering in credit card details into a webpage, such as a captive portal. Because the present embodiments do not rely on captive portals, this is not an option for the present embodiments. Instead, in some embodiments, the AAA may be interconnected to a billing system operated by a mobile carrier associated with the electronic device. For example, if the electronic device is associated with a T-Mobile service plan, the fee associated with the use of the on-board wireless network may be added to the user's T-Mobile bill. This fee assignment may occur automatically in response to the user replying with the correct response to the authentication challenge. In some further embodiments, the communication service may be associated with a usage balance (the balance may be an amount of money, an amount of "airtime," a number of messages, etc.). Accordingly, the fee may be paid via the communication provider and debited from a usage balance corresponding to the user of the electronic device. By improving the ease of payment for network access, the likelihood customers will actually utilize the on-board wireless network is increased, thereby decreasing the network resources dedicated to unauthenticated electronic devices.

It should be understood that although the authentication functionality is generally described herein as being performed by a AAA, other authorization entities are also envisioned. To this end, AAAs are generally associated with the use of the RADIUS protocol as defined by the Internet Engineering Task Force (IETF). That said, as it is used herein, the term AAA refers to any entity capable of perform authentication, authorization and/or accounting functionality. Accordingly, the term AAA is not intend to invoke the use of any particular protocol. Further, some on-board wireless networks may not utilize a AAA, instead utilizing a firewall and/or other network access control entities. Accordingly, any reference to functionality being performed by a AAA also envisions the performance by any alternative network access control entity. Some on-board wireless network may include additional authentication entities associated with individual network features. In these embodiments, the alternative network authentication entity may comprise the collective of each of these individual authentication entities.

Further, although the term "vehicle" is used throughout the present disclosure, the presence-based network authentication techniques may be utilized in some environments that are not conventionally referred to as vehicles. For example, in anticipation of a large public gathering (e.g., a football game, a major concert, a convention, etc.) network operators may deploy a plurality of small cells (e.g., femtocells, microcells, picocells, etc.) to ensure there is sufficient network capacity for the increase in network traffic. To avoid overloading these small cell networks, a network operator may restrict network access to devices operated by non-humans. Accordingly, the presently described presence-based network authentication techniques may be utilized to enforce this policy. As such, any use of the term "vehicle" also expressly includes any physical location in which a network is deployed that requires knowledge of a human operator prior to granting access to a network and/or network feature thereof. Accordingly, in these alternative "vehicles," the use of the term "on-board" or "aboard" refers to an entity being located within the coverage and/or footprint of such a network.

FIG. 1 depicts an embodiment of an exemplary on-board wireless network 100 capable of performing the presence-based network authentication capabilities as described herein. The on-board wireless network 100 may be contained in vehicle 102. The vehicle 102 may be associated with at least two communication links; an on-board communication link 137 to provide communication services to electronic devices 110 while the electronic devices 110 are disposed within the vehicle 102, and a communication link 147 between the vehicle 102 and a terrestrial base station 145 connected to a public switched telephone network (PSTN) 190. Although the communication link 147 is depicted as a communication link of an air-to-ground (ATG) network and referred to herein in the singular tense, it should be appreciated that other network configurations are envisioned. For example, the communication link 147 may be a satellite-based communication link. Furthermore, in some embodiments, multiple communication links 147 may be associated with the vehicle 102, e.g., the vehicle 102 may be communicatively connected to both an ATG communication link 147 and a satellite-based communication link 147.

To this end, the communication system may contain one or more modems 115 configured to be compatible with a plurality of different communication standards utilized by the on-board communication link 137 and the ATG communication link 147. For example, the on-board communication link 137 and the communication link 147 may utilize communication protocols associated with terrestrial communications (e.g., TDMA, GSM, CDMA, GSM, LTE, WiMAX, Wi-Fi, etc.) and/or associated with frequencies in the $K_a$ band, the $K_u$ band, the L band, and/or any other suitable wireless communication frequency bands. Each of the plurality of modems 115 may be connected to at least one respective antenna 108 and/or on-board wireless access point 125 configured to receive/transmit signals utilizing any supported communication protocol. It should be appreciated that although certain communication protocols are more suitable for use in one of the on-board communication link 137 or the communication link 147, this does not preclude the additional or alternative use of the communication protocol for the less suitable communication link.

Generally speaking, the electronic devices 110 may send and receive data over the on-board communication link 137 via the on-board wireless access points 125. The electronic devices 110 may include any mobile computing device, such as a smartphone, a tablet, a laptop computer, a personal digital assistant, an e-reader, smart glasses, smart watches, or any other mobile computing device capable of wireless communications. The plurality of modems 115 may determine that some of the data transmitted by the electronic devices 110 is addressed to a location external to the vehicle 105. Accordingly, the plurality of modems 115 may forward and/or transmit this data to the terrestrial base station 145 via the communication link 147 for routing to the data's ultimate destination.

The on-board wireless network 100 may also include a AAA 120 to control access to the on-board communication link 137. To this end, the AAA 120 may interpret a set of non-transitory, computer-readable instructions to perform the presence-based network authentication techniques described herein. As part of the presence-based network authentication, the AAA 120 may detect the presence of the electronic devices 110. More particularly, the AAA 120 may detect the presence of an electronic device 110 by receiving a registration message from the electronic device 110 transmitted over the on-board communication link 137. In response to receiving the registration message, the AAA 120 may generate and transmit an authentication challenge. If the electronic device 110 responds to the authentication challenge with the correct response, the AAA 120 may grant the electronic device 110 access to the on-board wireless network 100 and/or a set of network features associated with the on-board wireless network 100. According to certain aspects, the AAA 120 may also be fixedly attached to the vehicle 105 (e.g., the AAA 120) or disposed interconnected to the terrestrial base station 145 (e.g., the AAA 120'). Although FIG. 1 depicts the AAAs 120 and 120', as described above, other authentication entities are additionally or alternatively envisioned.

The on-board wireless network 100 may also include components associated with particular features of the on-board communication link 137. To this end, the on-board wireless network 100 may include a plurality of communication servers 130 associated with communication services, such as a SMSC for providing SMS services, a MMSC for providing MMS services, and/or a VOIP server for providing VOIP services. In order to transmit and/or receive the authentication challenge over the on-board communication link 137, the AAA 120 may utilize a communication service supported by one of the communication servers 130. It should be appreciated that some of the communication servers of the on-board wireless network 100 may be fixedly attached to the vehicle 105 (e.g., the communication servers 130); whereas, other communication servers of the on-board wireless network may be disposed interconnected to the terrestrial base station 145 (e.g., the communication servers 130'). In some embodiments, the on-board wireless network 100 may include just the communication servers 130 or the communication servers 130'. It should be appreciated that in embodiments that include AAA 120' and/or the communication servers 130', the communication path between the electronic devices 110 and the AAA 120' and/or the communication servers 130' may additionally include the communication link 147.

Additionally, the on-board wireless network 100 may include servers associated with network features other than communication services. For example, the on-board wireless network 100 may include a IFE server 140 for providing in-flight entertainment (e.g., video on demand, satellite TV, etc.). According to some aspects, the AAA 120 may also control authorization to the IFE services. It should be appreciated that although IFE refers to a vehicle "in flight," any action or description associated with an IFE server envisions the performance by an additional or alternative entertainment server associated with terrestrial and/or nautical vehicles.

In some embodiments, the AAA 120 may also transmit a secondary challenge to the electronic devices 110, via the on-board communication link 137, to grant access to content provided by the IFE server 140 and/or an additional communication service supported by the communication servers 130 (and/or communication servers 130'). Similar to processing the authentication challenge, if the electronic devices 110 respond to the secondary challenge with the correct response, the AAA 120 may grant the electronic devices 110 access to the content provided by the IFE server 140 and/or the additional communication service supported by the communication servers 130.

Figure 2:
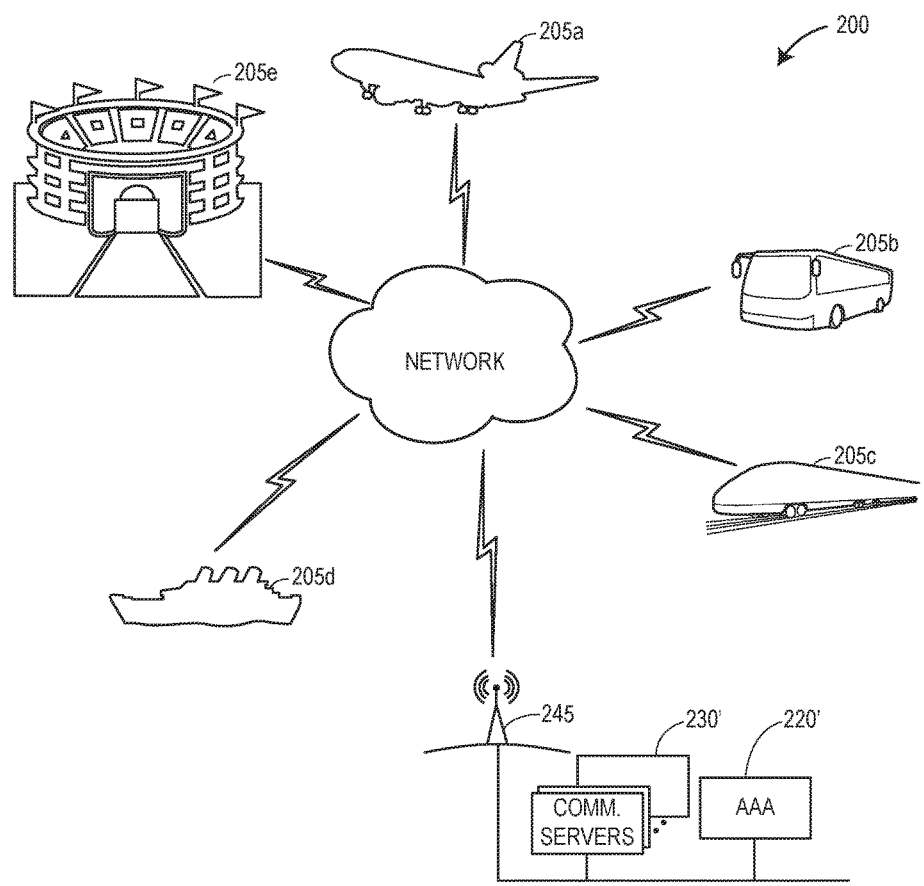
FIG. 2 illustrates an exemplary system including a plurality of different vehicle types with on-board wireless networks capable of performing one or more of the presence-based network authentication capabilities disclosed herein.

Turning to FIG. 2, depicted is an exemplary communication system 200 including a plurality of different vehicle types containing respective on-board wireless networks capable of performing the presence-based network authentication capabilities described herein. In particular, the communication system 200 includes an airplane 205a (such as the vehicle 105), a bus 205b, a train 205c, a boat 205d, and stadium 205e each equipped with respective on-board wireless networks. Beyond the vehicles 205a-e, it should be appreciated additional and/or alternative vehicles are envisioned (e.g., a car, a helicopter, a submarine, convention center, mall, etc.).

Each of the vehicles 205a-e may be in communication with a terrestrial base station 245 (such as the terrestrial base station 145) via an air-to-ground network 247 (such as the communication link 147). It should be appreciated that in some embodiments, the air-to-ground network 247 may additionally or alternatively include a satellite-based communication link. The terrestrial base station 245 may be interconnected with a AAA 220' (such as the AAA 120') and a plurality of communication servers 230' (such as the plurality of communication servers 130'). In some embodiments, the terrestrial base station 245 may be located on a nautical platform or other physical structure disposed in a body of water. In the communication system 200, the AAA 220' may control access to the respective on-board wireless networks associated with each of the vehicles 205a-e. In this sense, the AAA 220' may centralize the regulation of the respective on-board wireless networks associated with each of the vehicles 205a-e. Alternatively, it is also envisioned that any number of the vehicles 205a-e contain their own AAA for localized management of their respective on-board wireless networks.

While FIG. 2 depicts each of the vehicles 205a-e in communication with the terrestrial base station 245, it is envisioned that each of the vehicles 205a-e may be in communication with any number of terrestrial base stations. To this end, the communication system 200 may contain a plurality of terrestrial base stations disposed across a geographic region enabling the vehicles 205a-e to maintain a communication link over the ATG network 247 throughout the course of a journey.

Figure 3A:
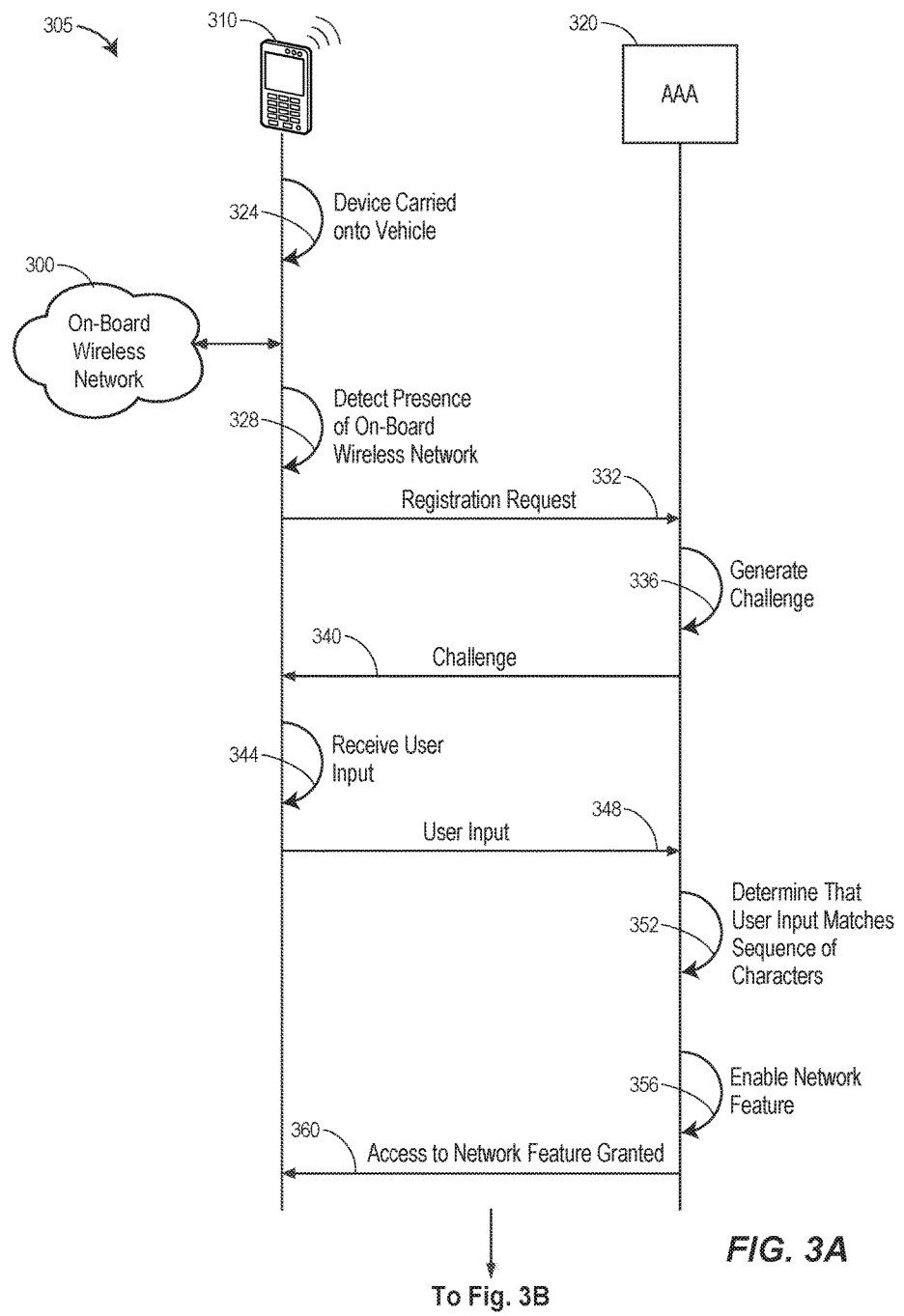
FIGS. 3A and 3B are illustrate an example signal diagram in which an authentication server, such as the AAA depicted in FIG. 1, performs a presence-based network authentication.
Figure 3B:
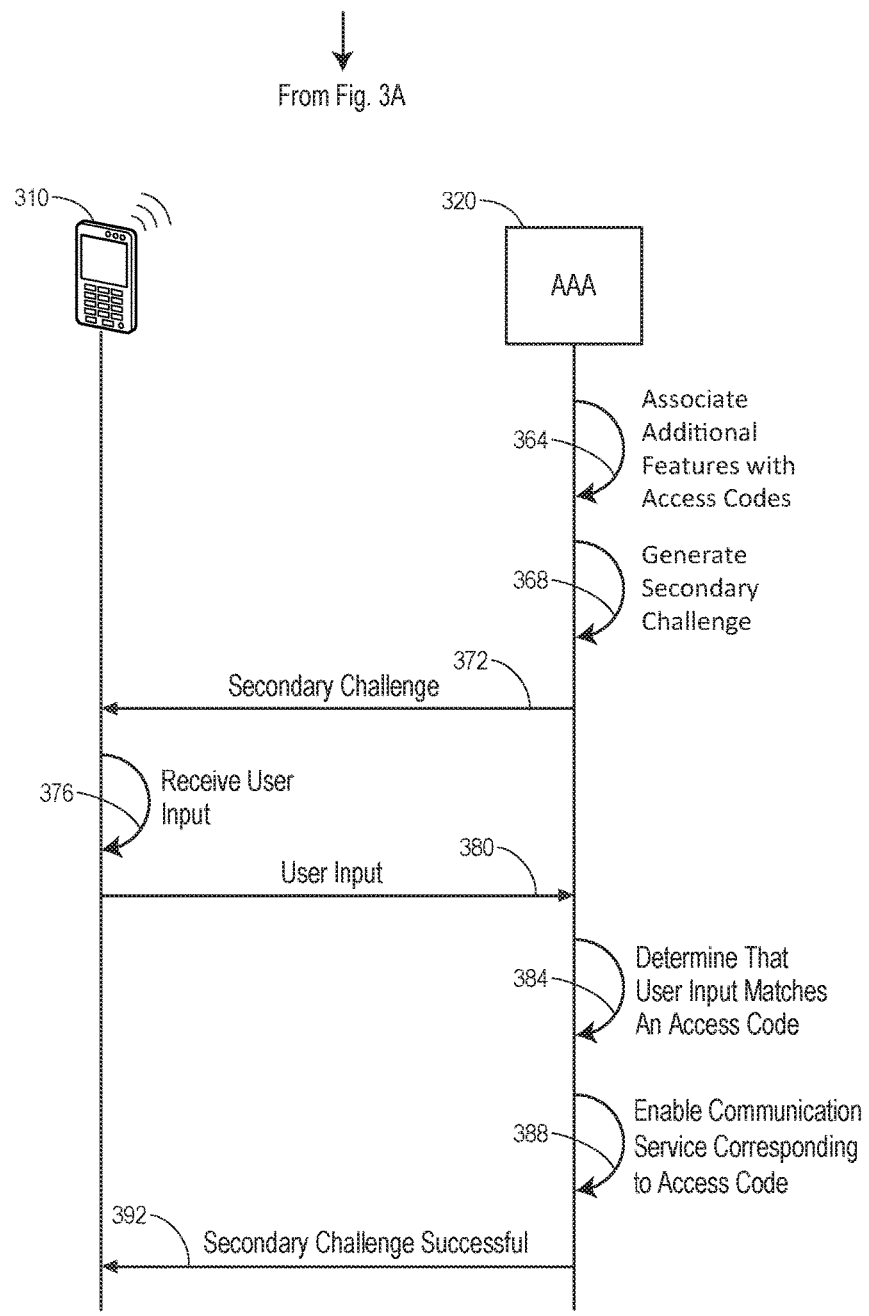

Turning to FIGS. 3A and 3B, illustrated is an example signal diagram 305 in which a AAA 320, such as the AAA 120 or 120', performs an exemplary presence-based network authentication.'). Although FIGS. 3A and 3B depict the AAA 320, as described above, other authentication entities are additionally or alternatively envisioned. The functionalities described with reference to the signal diagram 305 may be implemented, for example, by the on-board wireless network 100 and/or in the communication system 200.

The signal diagram 305 may begin on FIG. 3A when a user of an electronic device 310 carries (324) the electronic device 310 onto a vehicle (such as the vehicles 105 or 205a-e) equipped with an on-board wireless network (such as the on-board wireless network 100). As a result, the electronic device 310 may automatically detect (328) the presence of the on-board communication network. More particularly, the electronic device 310 may detect an on-board communication link (such as the on-board communication link 137) associated with the on-board communication network 300. The communication link may utilize any standard communication protocol supported by both the electronic device 310 and the on-board communication network 300.

Upon detecting the presence of the on-board communication network 300, the electronic device 310 may automatically generate and transmit (332) a registration message to the AAA 320. The registration message may contain an identity of the electronic device 310 (such as a MEID, a pESN, a UCCID, a MDN, a MIN, or any other identifier unique to the electronic device 310). The registration message may also include a passkey and/or any other authentication credentials associated with the on-board communication link.

When the AAA 320 receives the registration request, the AAA 320 may compare the identity of the electronic device 310 to a registry (not depicted) associated with access to the on-board communication network 300. If the registry contains an entry associated with the identity of the electronic device 310 (e.g., the user of the electronic device 310 has purchased a subscription plan with an operator of the on-board wireless network 300), the AAA 320 may grant the electronic device 310 network access in accordance to a profile in the corresponding registry entry. Conversely, if the identity of the electronic device 310 is not found within the registry, the AAA 320 may grant the electronic device 310 network access in accordance with a basic and/or default profile. Accordingly, the AAA 320 may update the registry to indicate that the electronic device 310 is associated with the basic profile. It should be appreciated that the basic profile may vary between electronic devices 310. For example, a basic profile may include access to a free internet-based web portal over an LTE link. However, if the electronic device 310 does not support LTE communications (as indicated by the registration message and/or subsequent feature negotiation messaging), the default profile associated with the electronic device 310 may not include the LTE internet-based web portal feature.

The AAA 320 may then analyze the profile corresponding to the electronic device 310 and any feature negotiation messaging to determine a set of network features supported by the on-board wireless network 300 that the electronic device 310 is capable of utilizing, but restricted by the current profile. Accordingly, the AAA 320 may generate (336) an authentication challenge to inform the user of the electronic device 310 that one of these features of the on-board wireless network 300 is available for use while aboard the vehicle. For example, the AAA 320 may determine that the profile associated with the electronic device 310 does not contain access to a SMS over Wi-Fi service. Accordingly, the authentication challenge may inform the user of the electronic device 310 that the on-board wireless network 300 supports SMS over Wi-Fi functionality.

Additionally, the authentication challenge may indicate an expected sequence of symbols with which the user of the electronic device 310 should reply to gain access to the available, but currently restricted, network feature. The indication may vary depending on the features supported by the electronic device 310. For example, if the electronic device 310 supports SMS messaging, the AAA 320 may generate a SMS-based authentication challenge. In this scenario, the authentication challenge may include a textual description of an expected sequence of symbols, such as the result of a math equation, a sequence of characters that should be repeated back, or a response contextual to a presence on a vehicle (for example, the contextual challenge described in U.S. application Ser. No. 13/781,841, which is incorporated by reference in its entirety). Similarly, if the electronic device 310 supports MMS messaging, the authentication challenge may include an image (such as a CAPTCHA image) indicating an expected sequence of characters. As another example, if the electronic device 310 supports VOIP calling, the authentication challenge may include an automatically generated VOIP call requesting that the user enters an expected sequence of characters with a number pad and/or recite the expected sequence of characters aloud.

In any case, after the AAA 320 generates the authentication challenge, the AAA 320 may transmit (340) the authentication challenge to the electronic device 310 via the appropriate communication service. It should be appreciated that, in some embodiments, the communication service utilized to transmit the authentication challenge may be different from a communication service to which the access code will grant access. For example, a VOIP challenge may be transmitted to grant access to a SMS application. In response, the electronic device 310 may present the authentication challenge to the user. The presentation of the authentication challenge may include an interface enabling the electronic device 310 to receive (344) input from the user. For example, the interface may include a virtual keyboard and/or number pad. Once the user has finished utilizing the interface to respond to the authorization challenge, the electronic device 310 may transmit (348) the received user input to the AAA 320 via the same communication service.

Upon receiving the user input from the electronic device 310, the AAA 320 may determine (352) if the user input matches the expected sequence of characters. To this end, the AAA 320 may compare the user input to a set of sequences that match the expected sequence of characters. It should be understood that the set of matching sequences may include sequences of characters that are slightly different than the expected sequence of characters. These slight differences may be indicative of common typographical errors. For example, if the expected sequence of characters is "mTXcdQ," the set of matching sequences may include "nTXcdQ" and/or "mTXcdO." Accordingly, if the user input is not included within the set of matching sequences, the AAA 320 may determine that the user input does not match the expected sequence of characters. As a result, the AAA 320 may prevent or otherwise block the electronic device 310 from accessing the network feature. In some scenarios, blocking access may simply entail the AAA 320 taking no further action.

Conversely, if the user input is included within the set of matching sequences, the AAA 320 may determine that the user input matches the expected sequence of characters. As a result, the AAA 320 may enable (356) the network feature for the electronic device 310. More particularly, the profile stored in the registry associated with the electronic device 310 may be updated to indicate that the electronic device 310 has access to the network feature. In some embodiments, network features may require further registration in order to function properly. For example, a VOIP network feature may require provisioning the electronic device 310 with an address at which the electronic device 310 may be reached over the corresponding VOIP network. Accordingly, as part of enabling the network feature, the AAA 320 may communicate with a server associated with the network feature to ensure that the network feature is properly provisioned for interoperation with the electronic device 310. After the network feature is successfully enabled, the AAA 320 may transmit (360) a confirmation message to the electronic device 310 informing the user that the electronic device 310 now has access to the feature of the on-board wireless network 300.

According to some aspects, the on-board wireless network 300 may utilize the AAA 320 determining that the user input matches the expected sequence of characters as a proxy for identifying that a human is operating the electronic device 310. This knowledge is important, as the on-board communication link may be bandwidth-restricted. In order to optimize bandwidth usage, the on-board wireless network 300 may only transmit certain messages to electronic devices with human operators. For example, the operator of the on-board wireless network 300 may advertise the availability of certain network features. One common feature is the ability to watch a video-on-demand through an IFE system. Accordingly, the on-board wireless network 300 may be configured to transmit an access code to a particular video to all human-operated electronic devices located within the vehicle. As a result of the present systems and methods, the limited bandwidth of the on-board communication link is not dedicated to transmitting these messages to electronic devices without human operators.

Continuing the signal diagram 305 onto FIG. 3B, the AAA 320 may be further configured to alert the user of the electronic device 310 as to the availability of one or more of these additional network features. To this end, the AAA 320 may compile a list of network features to which the electronic device 310 is still not authorized to utilize after successfully passing the authentication challenge. The AAA 320 may then select one or more of the additional network features to include in an alert to the electronic device 310. The selection may occur based upon any device and/or user characteristics associated with the electronic device 310 (e.g., a gender of the user, a model of the electronic device 310, etc.) and/or any contractual relationships between the operator of the on-board wireless network 300 and a provider of a network feature.

For each of the selected additional features, the AAA 320 may associate (364) the additional feature with another unique sequence of characters (e.g., access codes). In some embodiments, the sequence of characters may be generated in a manner similar to generating the expected sequence of characters used in the authentication challenge. According to some aspects, each of these sequences of characters may be unique to the a corresponding network feature. For example, if the selected additional features are unrestricted internet access and video-on-demand access, the unrestricted internet access may be associated with #12345; whereas the video-on-demand access may be associated with #56789.

After the AAA 320 has associated each of the selected additional features with a corresponding sequence of characters, the AAA 320 may generate (368) a secondary challenge in a format compatible with the communication service used to transmit the authentication challenge. Similar to the authentication challenge, the secondary challenge may instruct a user to input one or more of a plurality of indicated sequences of characters respectively associated with each of the selected network features. The AAA 320 may then transmit (372) the secondary challenge to the electronic device 310 via the communication service.

In response, the electronic device 310 may present an interface enabling the user of the electronic device 310 to input at least one of the plurality of indicated sequences of characters. The electronic device 310 may present the interface in a similar manner to the interface presented in response to the authentication challenge. The user of the electronic device 310 may then interact with the interface to input one or more of the indicated sequences of characters. Through this interaction with the interface, the electronic device 310 may receive (376) the user input. In response, the electronic device 310 may transmit (380) the user input to the AAA 320.

Similar to analyzing the user input in response to the authentication challenge, the AAA 320 may determine (384) whether the user input includes a sequence of characters that matches one or more of the sequences of characters associated with the selected network features. If the user input includes a sequence of characters that matches one of the sequences of characters associated with the selected network features, the AAA 320 may then enable (388) the corresponding network feature. To this end, the AAA 320 may further update the profile in the registry associated with the electronic device 310 to indicate that the electronic device 310 is authorized to access the corresponding network feature. It should be understood that if the electronic device 310 transmitted user input matching multiple sequences of characters, the AAA 320 may update the profile to indicate that the electronic device 310 has access to each of the selected network features corresponding to a sequence of characters that matches the user input. After updating the profile, the AAA 320 may then transmit (392) a notification to the electronic device 310 that the response to the secondary challenge was successful.

In one embodiment, one or more of the network features may be associated with a fee. To this end, when the AAA 320 generates the authentication and/or secondary challenge, the challenge may include an indication that enabling these network features will result in the fee being charged to the profile associated with the electronic device 310. For example, the authentication and/or secondary challenge may indicate that enabling the SMS service will incur a $3 charge. Thus, when the AAA 320 updates the profile associated with the electronic device 310 to enable the SMS service, the AAA 320 may additionally update the profile to add a $3 balance to the profile. According to certain aspects, the AAA 320 may be interconnected with a billing system for a wireless carrier (e.g., Verizon, AT&T, T-Mobile, or any other mobile network operator). As a result, the balance may be passed on and/or otherwise assigned against a payment balance between the wireless carrier and the user of the electronic device 310. Through this use of carrier billing, the need to collect credit card information prior to authorizing access to network features associated with a fee is eliminated. Consequently, the user may gain access to these network features more quickly than conventionally possible.

Turning now to FIGS. 4A-D, depicted are exemplary interfaces 400-475 associated with responding to a challenge received as part of the presence-based network authentication process. The interfaces 400-475 may be presented on an electronic device (such as one of the electronic devices 110 or 310). Although FIGS. 4A-D depict interfaces in response to an authentication and a secondary challenge being transmitted via SMS, it is envisioned that any other communication service may be utilized to transmit the challenges.

Accordingly, any alternate interface adapted to present the challenges and/or receive user input in response to an alternative communication format is also envisioned.

Figures 4A, 4B:
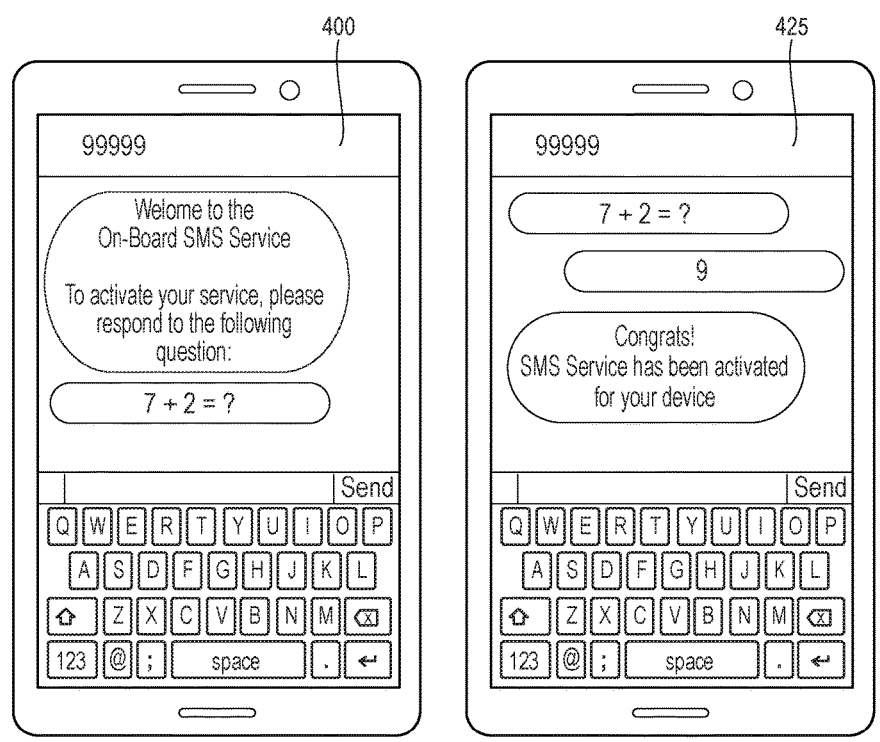
FIGS. 4A-4D are exemplary interfaces displayed on an electronic device, such as one of the electronic devices 110 of FIG. 1, associated with the performance of a presence-based network authentication.

FIG. 4A depicts the exemplary interface 400 that may be displayed in response to a user carrying the electronic device onto a vehicle equipped with an on-board wireless network (such as one of the on board wireless networks 100 or 300). More particularly, the interface 400 may be adapted to display an authentication challenge in response to the user carrying the electronic device onto the vehicle. As depicted, the authentication challenge may identify a particular feature of the on-board wireless network ("On-Board SMS service"). The authentication challenge may also include an indication of a sequence of characters with which the user should reply to gain access to the network feature ("7+2="). Additionally, the interface 400 may include an interface element enabling the user to input a response to the authentication challenge (the virtual keyboard).

FIG. 4B depicts the exemplary interface 425 informing the user that the authentication challenge was successful. Prior to the display of the interface 425, the user may have responded to the authentication challenge with a sequence of characters ("9"). Because this response matched the expected response to the authentication challenge, the on-board wireless network may have determined that the authentication challenge was successful. Accordingly, electronic device may receive a notification from the on-board wireless network indicating that the electronic device has been authorized to access the corresponding network feature. In response, the interface 425 may display this notification to the user of the electronic device ("SMS service has been activated").

Figures 4C, 4D:
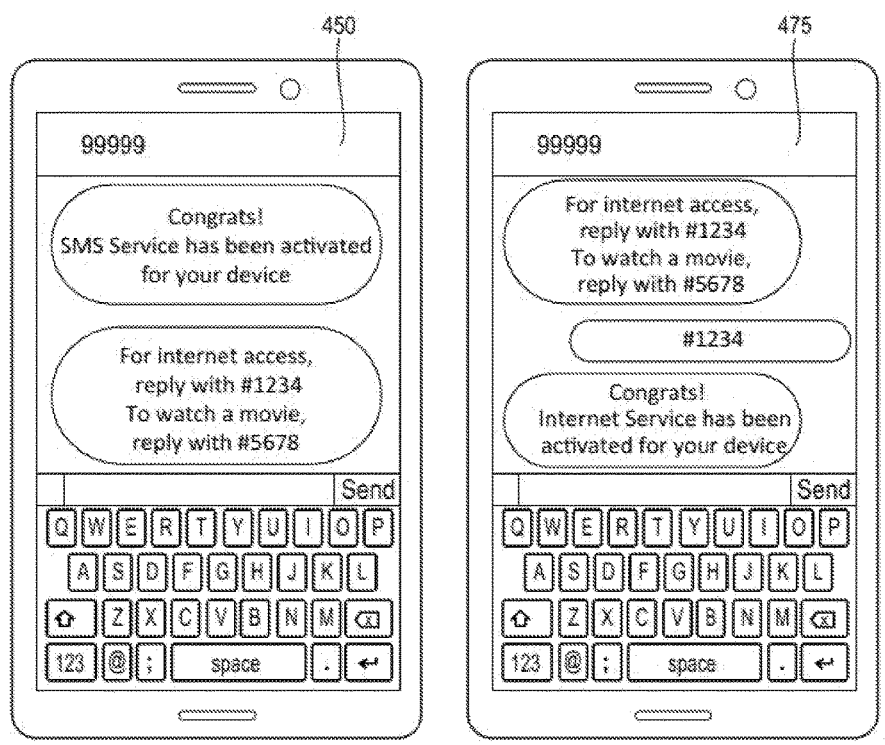

FIG. 4C depicts the exemplary interface 450 displaying a secondary challenge subsequent to a successful authentication challenge. The secondary challenge may identify several additionally available network features ("internet access" and "watch a movie"). Each of these network features may be associated with a respective sequence of characters ("#1234" and "#5678"). The interface 450 may also include an interface element enabling the user to input a response to the secondary challenge (the virtual keyboard).

FIG. 4D depicts the exemplary interface 475 informing the user that the secondary challenge was successful. Prior to the display of the interface 475, the user may have responded to the secondary challenge with a sequence of characters ("#1234"). Because this response matched the sequence of characters associated with the internet access feature, the on-board wireless network may have authorized the electronic device to access the internet service feature. In response, the on-board wireless network may transmit a notification to the electronic device indicating that the network feature associated with the sequence of characters was successfully authorized for the electronic device. Accordingly, the interface 475 may display this notification to the user of the electronic device ("Internet service has been activated"). It should be appreciated that the depicted interfaces 400-475 are merely exemplary and many alternative interfaces may be implemented without departing from the scope of the present invention.

Figure 5:
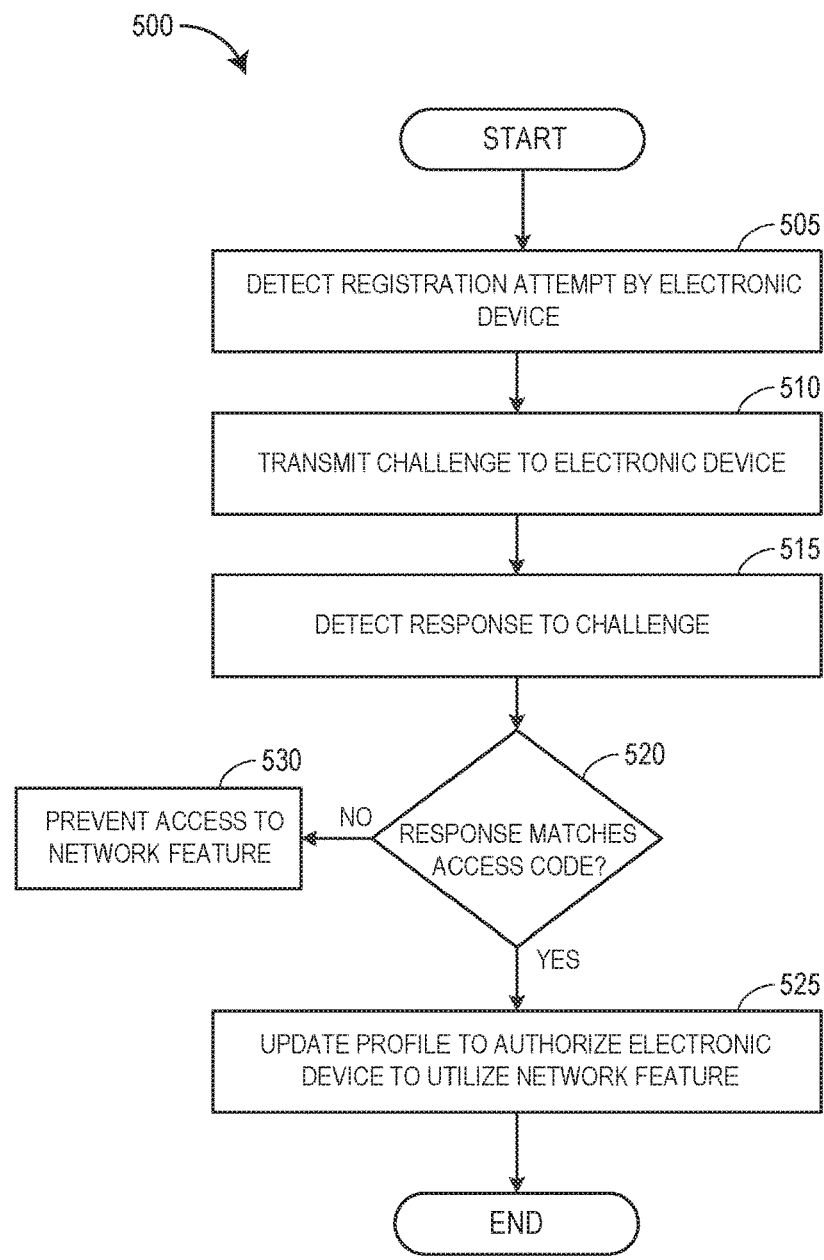
FIG. 5 is an example flow diagram of an example method for performing a presence-based network authentication, which may be implemented in the communication system depicted in FIG. 1.

FIG. 5 depicts an example method 500 for performing the presence-based network authentication functionality. The method may be performed by an authentication server (such as the AAA 120 or 320) in communication with an electronic device (such as one of the electronic devices 110 or 310) over an on-board wireless network (such as one of the on-board wireless networks 100 or 300).

The method 500 may begin when the authentication server detects a registration attempt by the electronic device (block 505). The electronic device may have initiated the registration attempt in response to the electronic device detecting the presence of the on-board wireless network. In one embodiment, the registration attempt may include the electronic device transmitting a registration message to the authentication server.

In response to the detection of the registration attempt, the authentication server may generate and transmit a challenge to the electronic device (block 510). The authentication server may transmit the challenge via a communication link the on-board wireless network. The challenge may include an access code associated with access to the on-board wireless network and/or a feature of the on-board wireless network (e.g., a SMS service, a MMS service, a VOIP service, etc.). In one embodiment, the access code may be a sequence of symbols, that when received by the authentication server, indicates that the electronic device should be authorized to utilize the on-board wireless network and/or the corresponding feature of the on-board wireless network. According to certain aspects, the access code may vary between and among different electronic devices attempting to register with the on-board wireless network.

At some point after the authentication server transmitted the challenge, the authentication server may detect a response to the challenge from the electronic device (block 515). The response may include an indication of user input received by the electronic device. The user of the electronic device may have provided the input via a text entry interface, an audio output, and/or any other suitable interaction with the electronic device. In response to detecting the response, the authentication server may determine whether the indication of the user input matches the access code (decision 520).

When the authentication server determines that the indication of the user input and the access code do not match (the "NO" fork), the authentication server may prevent and/or block access to the network feature (block 530). As it is used generally herein, the words "block" and/or "prevent" in reference to a network feature refer to configuring a network in such a manner that the electronic device is unable to utilize the network feature. In one embodiment, blocking and/or preventing may include the authentication server setting a parameter in a profile corresponding to the electronic device to a state that indicates that the electronic device does not have access to the network feature. According to certain aspects, blocking and/or preventing may include the authentication server verifying that the parameter in the profile corresponding to the electronic device has been previously set to indicate that the electronic device does not have access to the network feature. Moreover, it should be appreciated that the terms "block" and/or "prevent" as it relates to a communication service (e.g., SMS, MMS, VOIP, etc.) refers to the ability to communicate with a party external to the on-board wireless network (including other electronic devices disposed in the same vehicle).

Conversely, when the authentication server determines that the indication of the user input and the access code match (the "YES" fork), the authentication server may update the profile corresponding to the electronic device to indicate that the electronic device is authorized to utilize the on-board wireless network and/or network feature thereof (block 525). In one embodiment, the access to the network feature may be restricted by an amount of time, an amount of usage, and/or a number of trips. Accordingly, when the authentication server updates the profile corresponding to the electronic device, the authentication server may additionally update the profile to include any of the aforementioned limitations on the usage of the network feature.

Figure 6:
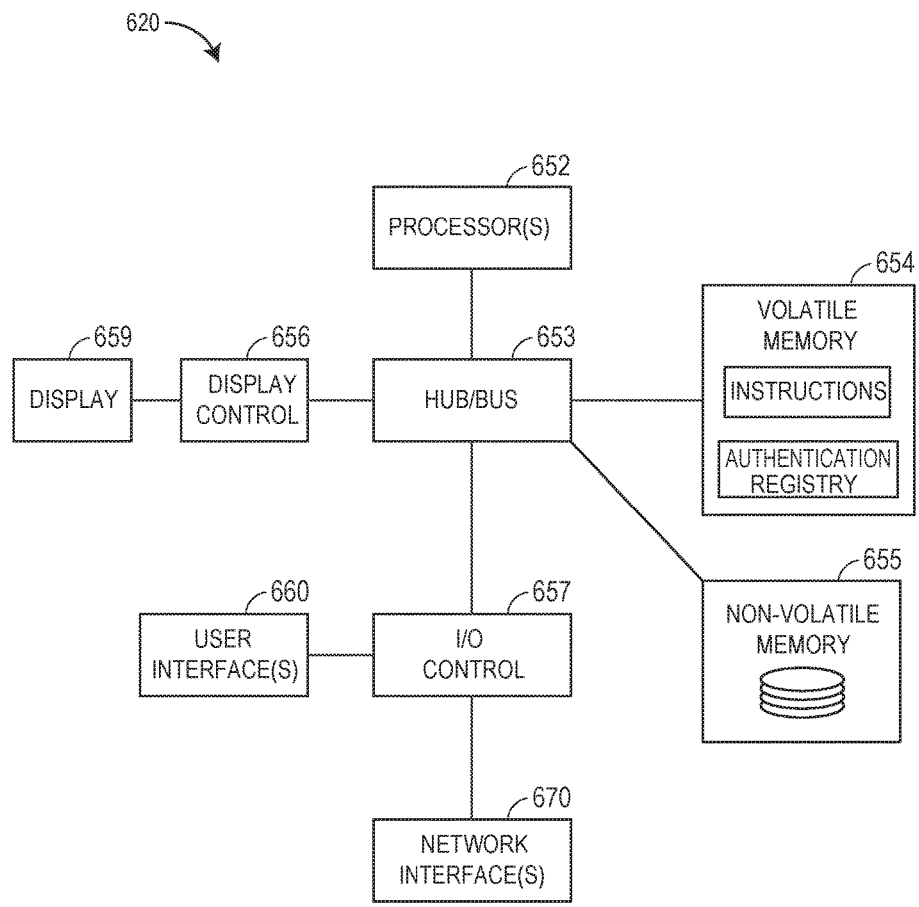
FIG. 6 is a block diagram of an authentication server implementing a presence-based network authentication capability, such as the authentication server depicted in FIG. 1.

FIG. 6 illustrates a block diagram of an example authorization server 620 (such as one of the AAA 120 or 320) that may be utilized in the on-board wireless network 100. The authorization server 620 may include, for example, one more central processing units (CPUs) or processors 652, and one or more busses or hubs 653 that connect the processor(s) 652 to other elements of the authorization server 620, such as a volatile memory 654, a non-volatile memory 655, a display controller 656, and an I/O controller 657. The volatile memory 654 and the non-volatile memory 655 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 654 and/or the memory 655 may store instructions 658 that are executable by the processor 652. For example, in an authorization server particularly configured to perform the presence-based network authentication, the instructions may be the instructions comprising the AAA 120. In some embodiments, at least one of the memories 654 and 655 additionally store an authentication registry associated with storing a plurality of profiles corresponding to all devices with access to an on-board wireless network. Each profile may identify a particular electronic device and a list of network features to which the electronic device has access.

In an embodiment, the display controller 656 may communicate with the processor (s) 652 to cause information to be presented on a connected display device 659. In an embodiment, the I/O controller 657 may communicate with the processor(s) 652 to transfer information and commands to/from the user interface 660, which may include a mouse, a keyboard or key pad, a touch pad, click wheel, lights, a speaker, a microphone, etc. In an embodiment, at least portions of the display device 659 and of the user interface 660 are combined in a single, integral device, e.g., a touch screen. Additionally, data or information may be transferred to and from the authorization server 620 via a network interface 670. In some embodiments, the authorization server 620 may include more than one network interface 670, such as a wireless interface and a wired interface.

The illustrated authorization server 620 is only one example of an authorization server suitable to be particularly configured for use in the on-board wireless network 100. Other embodiments of the authorization server 620 may also be particularly configured for use in the on-board wireless network 100, even if the other embodiments have additional, fewer, or alternative components than shown in FIG. 6, have one or more combined components, or have a different configuration or arrangement of the components. Moreover, the various components shown in FIG. 6 can be implemented in hardware, a processor executing software instructions, or a combination of both hardware and a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A method of authenticating an electronic device with a wireless network the method comprising detecting, by an authentication server, a registration request, the registration request being automatically transmitted by the electronic device in response to the electronic device detecting the presence of the wireless network; in response to detecting the registration request, transmitting, via the wireless network, a challenge, the challenge including (i) an indication of an expected sequence of symbols and (ii) an indication of a first feature of the wireless network; detecting, at the authentication server, a response to the challenge, the response including user input received by the electronic device; determining, by the authentication server, that the user input matches the expected sequence of symbols; and causing, by the authentication server, the electronic device to be authorized to utilize the first feature of the wireless network.

2. The method of the previous aspect, wherein the first feature of the wireless network is a communication service, the communication service being one or more of a short message service (SMS), a multimedia messaging service (MMS), a voice over internet protocol (VOIP) service, an internet communication service, or an email service.

3. The method of any combination of the preceding aspects, further comprising determining, by the authentication server, that the user input does not match the desired sequence of symbols; and blocking, by the authentication server, the electronic device from accessing the first feature of the wireless network.

4. The method of any combination of the preceding aspects, wherein the challenge comprises at least one of an image, a math equation, or a contextual challenge being contextual to a vehicle.

5. The method of any combination of the preceding aspects, further comprising responsive to the electronic device being authorized to utilize the first feature of the wireless network, transmitting, by the authentication server, a notification that the electronic device has been authorized to utilize the first feature of the wireless network.

6. The method of any combination of the preceding aspects, further comprising subsequent to the electronic device being authorized to utilize the first feature of the wireless network: associating, by the authentication server, a plurality of additional network features of the wireless network with respective sequences of symbols; and transmitting, to the electronic device, a secondary challenge, the secondary challenge including an indication of the plurality of additional network features and the respective sequences of symbols.

7. The method of any combination of the preceding aspects, further comprising: detecting, at the authentication server, a response to the secondary challenge, the response including an indication of a second set of user input, determining, by the authentication server, that the second set of user input matches one or more of the respective sequences of symbols; and causing, by the authentication server, the electronic device to be authorized to utilize one or more network features corresponding to the one or more sequences of symbols.

8. The method of any combination of the preceding aspects, wherein at least one of the first network feature or the one or more network features is associated with a fee; and causing, by the authentication server, the fee to be billed to a wireless carrier associated with the electronic device or a communication service provider associated with a user of the electronic device.

9. The method of any combination of the preceding aspects, wherein the plurality of additional network features include at least one of unrestricted internet access, limited internet access, in-flight entertainment (IFE) services, or virtual private network (VPN) access.

10. A system for authenticating an electronic device with a wireless network, the system comprising one or more processors; and one or more non-transitory, computer-readable storage media storing computer-executable instructions that, when executed by the one or more processors, cause the system to detect a registration attempt by the electronic device, the registration attempt initiated in response to the electronic device detecting the presence of the wireless network; in response to detecting the registration attempt, transmit, via the wireless network, a challenge, the challenge including an indication of an access code associated with a first feature of the wireless network; detect a response to the challenge, the response including an indication of user input received by the electronic device; determine that the user input matches the access code; and update a profile associated with the electronic device to authorize the electronic device to utilize the first feature of the wireless network.

11. The system of any combination of the preceding aspects, wherein the first feature of the wireless network is a communication service, the communication service being one or more of: a short message service (SMS), a multimedia messaging service (MMS), a voice over internet protocol (VOIP) service an internet communication service, or an email service.

12. The system of any combination of the preceding aspects wherein the computer-executable instructions, when executed by the one or more processors, further cause the system to determine that the user input does not match the access code; and prevent the electronic device from accessing the first feature of the wireless network.

13. The system of any combination of the preceding aspects, wherein the challenge comprises at least one of an image, a math equation, or a contextual challenge being contextual to a vehicle.

14. The system of any combination of the preceding aspects, wherein the computer-executable instructions, when executed by the one or more processors, further cause the system to responsive to the electronic device being authorized to utilize the first feature of the wireless network, transmit a confirmation that the electronic device has been authorized to utilize the first feature of the wireless network.

15. The system of any combination of the preceding aspects, wherein the computer-executable instructions, when executed by the one or more processors, further cause the system to subsequent to the electronic device being authorized to utilize the first feature of the wireless network: associate a plurality of additional network features of the wireless network with respective access codes; and transmit to the electronic device a secondary challenge, the secondary challenge including an indication of the plurality of additional network features and the respective access codes.

16. The system of any combination of the preceding aspects, wherein the computer-executable instructions, when executed by the one or more processors, further cause the system to detect a response to the secondary challenge, the response including an indication of a second set of user input, determine that the second set of user input matches one or more access codes of the plurality of respective access codes; and update the profile associated with the electronic device to authorize the electronic device to utilize the one or more network features corresponding to the one or more access codes.

17. The system of any combination of the preceding aspects, wherein the computer-executable instructions, when executed by the one or more processors, further cause the system to causing a fee associated with at least one of the first network feature or the one or more network features to be billed to a wireless carrier associated with the electronic device or a communication service provider associated with a user of the electronic device.

18. The system of any combination of the preceding aspects, wherein the plurality of additional network features include at least one of unrestricted internet access, limited internet access, in-flight entertainment (IFE) services, or virtual private network (VPN) access.

19. A system for authenticating an electronic device with a wireless network, the system comprising registration detection means for detecting a registration attempt by the electronic device, the registration attempt initiated in response to the electronic device detecting the presence of the wireless network; transmission means for, responsive to detecting the registration attempt, transmitting, via the wireless network, a challenge, the challenge including an indication of an access code associated with a first feature of the wireless network; response detection means for detecting a response to the challenge, the response including an indication of user input received by the electronic device; determination means for determining that the user input matches the access code; and update means for updating a profile associated with the electronic device to authorize the electronic device to utilize the first feature of the wireless network.

20. The system of any combination of the preceding aspects, wherein the system further comprises access prevention means for, responsive to the determination means determining that the user input does not match the access code, preventing the electronic device from accessing the first feature of the wireless network.

What is claimed is:

1. A method of authenticating an electronic device with a wireless network the method comprising:
    detecting, by an authentication server, a registration request, the registration request being automatically transmitted by the electronic device in response to the electronic device detecting the presence of the wireless network;
    in response to detecting the registration request, transmitting, via the wireless network, a challenge, the challenge including (i) an indication of an expected sequence of symbols and (ii) an indication of a first feature of the wireless network;

detecting, at the authentication server, a response to the challenge, the response including user input received by the electronic device;

determining, by the authentication server, that the user input matches the expected sequence of symbols;

in response to the user input matching the expected sequence of symbols, causing, by the authentication server, the electronic device to be authorized to utilize the first feature of the wireless network; and subsequent to the electronic device being authorized to utilize the first feature of the wireless network:

associating, by the authentication server, a plurality of additional network features of the wireless network with respective sequences of symbols, transmitting, to the electronic device, a secondary challenge, the secondary challenge including an indication of the plurality of additional network features and the respective sequences of symbols, detecting, at the authentication server, a response to the secondary challenge, the response including an indication of a second set of user input, determining, by the authentication server, that the second set of user input matches one or more of the respective sequences of symbols, and causing, by the authentication server, the electronic device to be authorized to utilize one or more network features corresponding to the one or more sequences of symbols.

2. The method of claim 1, wherein the first feature of the wireless network is a communication service, the communication service being one or more of: a short message service (SMS), a multimedia messaging service (MMS), a voice over internet protocol (VOIP) service, an internet communication service, or an email service.

3. The method of claim 1, further comprising:
determining, by the authentication server, that the user input does not match the desired sequence of symbols; and
blocking, by the authentication server, the electronic device from accessing the first feature of the wireless network.

4. The method of claim 1, wherein the challenge comprises at least one of: an image, a math equation, or a contextual challenge being contextual to a vehicle.

5. The method of claim 1, further comprising:
responsive to the electronic device being authorized to utilize the first feature of the wireless network, transmitting, by the authentication server, a notification that the electronic device has been authorized to utilize the first feature of the wireless network.

6. The method of claim 1, wherein:
at least one of the first network feature or the one or more network features is associated with a fee; and
causing, by the authentication server, the fee to be billed to a wireless carrier associated with the electronic device or a communication service provider associated with a user of the electronic device.

7. The method of claim 1, wherein the plurality of additional network features include at least one of: unrestricted internet access, limited internet access, in-flight entertainment (IFE) services, or virtual private network (VPN) access.

8. A system for authenticating an electronic device with a wireless network, the system comprising:
one or more processors; and
one or more non-transitory, computer-readable storage media storing computer-executable instructions that, when executed by the one or more processors, cause the system to:
detect a registration attempt by the electronic device, the registration attempt initiated in response to the electronic device detecting the presence of the wireless network;
in response to detecting the registration attempt, transmit, via the wireless network, a challenge, the challenge including an indication of an access code associated with a first feature of the wireless network;
detect a response to the challenge, the response including an indication of user input received by the electronic device;
determine that the user input matches the access code;
in response to the user input matching the access code, update a profile associated with the electronic device to authorize the electronic device to utilize the first feature of the wireless network; and
subsequent to the electronic device being authorized to utilize the first feature of the wireless network:
associate a plurality of additional network features of the wireless network with respective access codes,
transmit to the electronic device a secondary challenge, the secondary challenge including an indication of the plurality of additional network features and the respective access codes,
detect a response to the secondary challenge, the response including an indication of a second set of user input,
determine that the second set of user input matches one or more access codes of the plurality of respective access codes, and
update the profile associated with the electronic device to authorize the electronic device to utilize the one or more network features corresponding to the one or more access codes.

9. The system of claim 8, wherein the first feature of the wireless network is a communication service, the communication service being one or more of: a short message service (SMS), a multimedia messaging service (MMS), a voice over internet protocol (VOIP) service an internet communication service, or an email service.

10. The system of claim 8, wherein the computer-executable instructions, when executed by the one or more processors, further cause the system to:
determine that the user input does not match the access code; and
prevent the electronic device from accessing the first feature of the wireless network.

11. The system of claim 8, wherein the challenge comprises at least one of: an image, a math equation, or a contextual challenge being contextual to a vehicle.

12. The system of claim 8, wherein the computer-executable instructions, when executed by the one or more processors, further cause the system to:
responsive to the electronic device being authorized to utilize the first feature of the wireless network, transmit a confirmation that the electronic device has been authorized to utilize the first feature of the wireless network.

13. The system of claim 8, wherein the computer-executable instructions, when executed by the one or more processors, further cause the system to:

causing a fee associated with at least one of the first network feature or the one or more network features to be billed to a wireless carrier associated with the electronic device or a communication service provider associated with a user of the electronic device.

14. The system of claim 8, wherein the plurality of additional network features include at least one of: unrestricted internet access, limited internet access, in-flight entertainment (IFE) services, or virtual private network (VPN) access.

15. A non-transitory computer readable medium storing computer-executable instructions that, when executed by one or more processors, cause the one or more processors to:
    detect a registration attempt by an electronic device, the registration attempt initiated in response to the electronic device detecting the presence of a wireless network;
    responsive to detecting the registration attempt, transmit, via a wireless network, a challenge, the challenge including an indication of an access code associated with a first feature of the wireless network;
    detect a response to the challenge, the response including an indication of user input received by the electronic device;
    determine that the user input matches the access code; and
    in response to the user input matching the access code, update a profile associated with the electronic device to authorize the electronic device to utilize the first feature of the wireless network; and
    subsequent to the electronic device being authorized to utilize the first feature of the wireless network:
        associate a plurality of additional network features of the wireless network with respective access codes,
        transmit, via the wireless network, to the electronic device a secondary challenge, the secondary challenge including an indication of the plurality of additional network features and the respective access codes,
        detect a response to the secondary challenge, the response including an indication of a second set of user input,
        determine that the second set of user input matches one or more access codes of the plurality of respective access codes, and
        update the profile associated with the electronic device to authorize the electronic device to utilize the one or more network features corresponding to the one or more access codes.

16. The computer readable medium of claim 15, wherein the instructions, when executed, cause the one or more processors to:
    responsive to determining that the user input does not match the access code associated with the first feature of the wireless network, prevent the electronic device from accessing the first feature of the wireless network.

* * * * *